United States Patent [19]

Skrovanek et al.

[11] 4,115,668
[45] Sep. 19, 1978

[54] ECHO SUPPRESSOR WITH SF TRANSMISSION AND REGENERATION

[75] Inventors: Ambroz K. Skrovanek, Bethesda, Md.; Fred E. Clark, Jr., Arlington, Va.

[73] Assignee: Harvey Hubbell Incorporated, Bridgeport, Conn.

[21] Appl. No.: 792,096

[22] Filed: Apr. 29, 1977

[51] Int. Cl.² ............................................. H04B 3/20
[52] U.S. Cl. ................................................ 179/170.2
[58] Field of Search ............ 179/170.2, 170.6, 170 R, 179/170.4, 170 A, 170 C, 175.31 E

[56] References Cited

U.S. PATENT DOCUMENTS

| | | | |
|---|---|---|---|
| 3,562,439 | 2/1971 | Lugten | 179/84 VF |
| 3,725,612 | 4/1973 | Campanella et al. | 179/170.6 |
| 3,769,466 | 10/1973 | Von Pfeil et al. | 179/170.2 |
| 3,937,907 | 2/1976 | Campanella et al. | 179/170.6 |

Primary Examiner—Kathleen H. Claffy
Assistant Examiner—Randall P. Myers
Attorney, Agent, or Firm—Roylance, Abrams, Berdo & Farley

[57] ABSTRACT

An interface unit for a four wire telephone circuit includes an echo suppressor. A filter circuit is connected to the transmit line drop side to detect voice and SF signals and to selectively couple a regenerated SF signal and the voice signal to the line side of the transmit line. A passive filter is selectively coupled to the receive side to attenuate voice echo but bypass SF signals.

8 Claims, 8 Drawing Figures

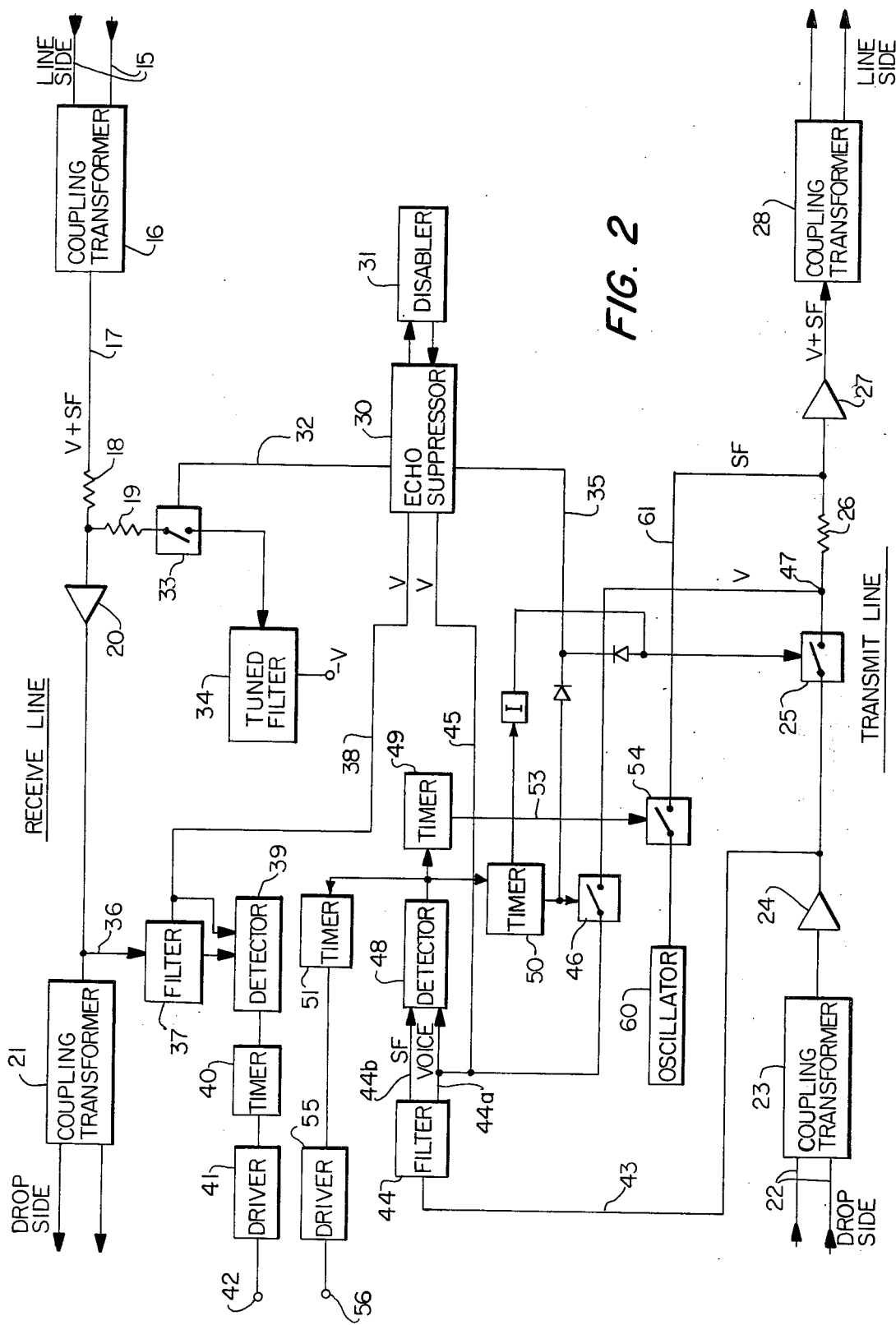

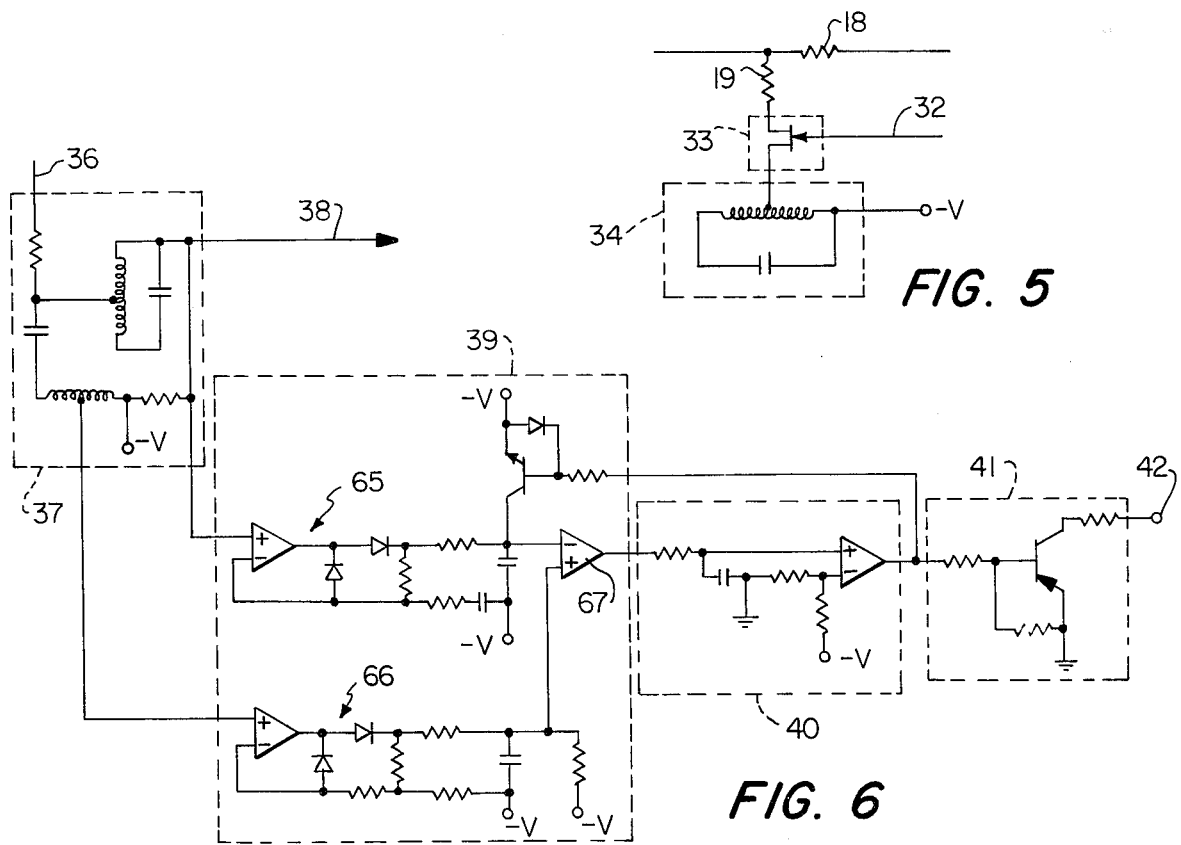
FIG. 5
FIG. 6
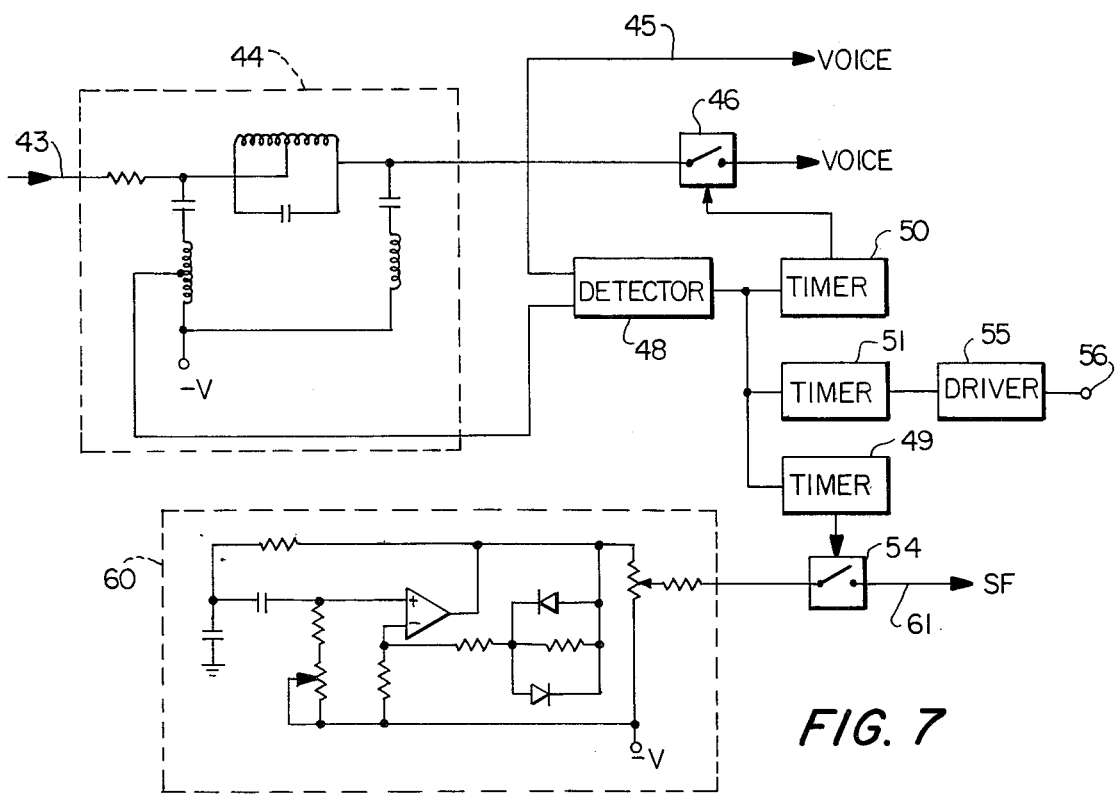
FIG. 7

ECHO SUPPRESSOR WITH SF TRANSMISSION AND REGENERATION

This invention relates to telephone circuit apparatus and particularly to apparatus usable in conjunction with echo suppression means to assure continued presence of a control signal.

BACKGROUND OF THE INVENTION

In telephone signalling equipment it is common to use a control signal at a single frequency, this signal being described as an SF signal, the frequency of this signal being "in-band" in the sense of being within the spectrum of voice frequencies transmitted over the telephone lines and through the other equipment and media comprising the entire system. A discussion of a typical system and this signal appears in U.S. Pat. No. 3,349,191, Mann, to which reference is made.

It is also common practice to employ echo suppression devices in telephone equipment for the general purpose of suppressing voice echoes which appear on the line and which tend to degrade the quality of the system. Such echoes are distracting and annoying to those using the equipment and become particularly noticeable and annoying when the path of travel of the signals through the transmission medium becomes quite long as, for example, in satellite systems and long-distance microwave systems.

Echo suppressors of this general type operate by comparing the voice signal levels on the two sides of the transmission system, i.e., the "transmit" side and the "receive" side with reference to a station or drop, and by opening or inserting a very high attenuation into that side which has the lower signal level. Thus, the assumption is made that the side carrying the voice will be seen by the comparing equipment to have the higher signal level and that any signal appearing on the other side is an echo and should be suppressed. This is basically a valid assumption and such equipment normally operates effectively.

However, when echo suppression is used, opening or greatly attenuating one line has the undesirable effect of removing the SF signal also, since it is in-band. In order to avoid this problem, it is customary to provide some local exchange equipment with apparatus for removing the SF signal from that portion of the line which includes an echo suppressor and the drop. Thus, the SF signal is removed from the line before it reaches the echo suppressor if one is used, and the voice signal attenuation accomplished by the echo suppressor therefore has no effect on the SF signal.

When station equipment is provided without echo suppression, it is necessary to insert echo suppression to permit use of the equipment in long distance service, but is is often not possible because of distance involved to insert such echo suppression between the SF equipment and the station. Alternatively, if neither is provided, it is necessary to provide both. In this case it would be necessary to provide bypass circuits around the ES unit, which can be done but only at considerable cost and waste of space.

BRIEF DESCRIPTION OF THE INVENTION

Accordingly, an object of the present invention to provide means for maintaining continued existence of the SF signal and to permit echo suppression so that the suppression does not interfere with the SF signal.

A further object is to provide an improved apparatus for avoiding loss or interruption of the SF signal.

Briefly described, the invention includes, in an interface unit for interconnecting voice signals and SF signals between a drop side terminal and a four wire transmission system having receive and transmit line pairs, the unit being of the type having echo suppressor means for comparing voice signal levels on the receive and transmit lines and for reducing the signal level on the one of those lines having the smaller voice signal level, an improved apparatus for assuring continued transmission of an SF signal comprising passive circuit means interconnected to the receive line pair for preventing reduction of the SF signal level when said echo suppressor means reduces the voice signal level on said receive line, circuit means for separating the transmit line into electrically isolated "drop" and "line" sides, means coupled to said drop and line sides of said transmit line for coupling an internally generated SF signal to said line side of said transmit line whenever an SF signal is present on said drop side of said transmit line; and means responsive to said echo suppressor means for coupling a voice only signal to said line side of said transmit line whenever the voice signal level on said receive line is lower than the voice signal level on said transmit line.

In order that the manner in which the foregoing and other objects are attained in accordance with the invention can be understood in detail, a particularly advantageous embodiment thereof will be described with reference to the accompanying drawings, which form a part of this specification and wherein:

FIG. 2 is a schematic diagram, partly in block form, of an apparatus in accordance with the invention.

FIG. 5 is a more detailed schematic diagram of switch and filter circuits usable in the apparatus of FIG. 2;

FIG. 6 is a more detailed schematic diagram of filter, detector, timer and driver circuits usable in the apparatus of FIG. 2; and FIG. 7 is a more detailed schematic diagram of filter and oscillator circuits usable in the apparatus of FIG. 2.

Figure 1A:
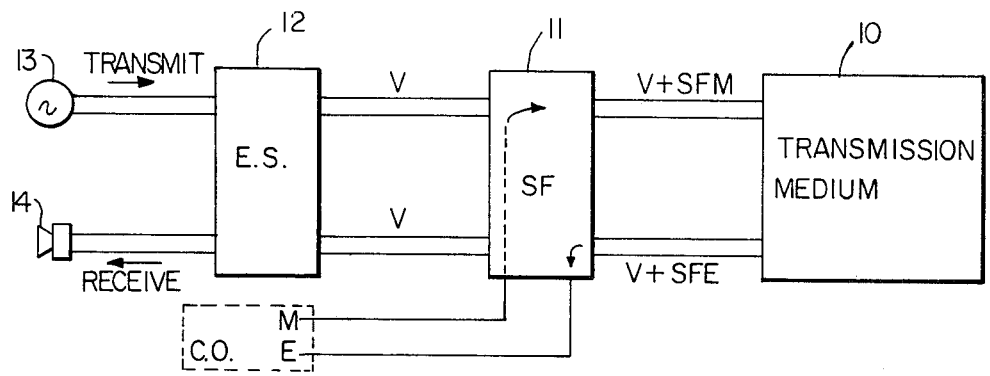
FIGS. 1A and 1B are schematic diagrams, in block form, showing prior art apparatus.

FIG. 1 illustrates the prior art system which was previously discussed, in which a four-wire transmission system includes a transmission medium 10, and SF equipment 11 to which the transmit and receive lines from the transmission medium are connected. Voice and SF signals pass between these two portions of the system. The SF equipment is connected to an echo suppressor device 12 to which the drop side equipment, including a transmitter 13 and a receiver 14 are connected. This diagram is, of course, somewhat simplified and other equipment may intervene. For example, the wires extending between the echo suppression equipment and the transmitter and receiver may include an additional transmission medium, or such medium may exist at other portions of the system. However, this does not change the basic principles of operation of the apparatus.

Of particular significance, as previously explained, is that the SF unit removes the SF signal from the receive line to and converts it into a DC control signal (E wire) and provides SF to the transmit line controlled by an M wire, as indicated by the arrows thereon, so that only voice signals exist on the drop side of the SF equipment. Thus, echo suppression does not affect the existence of a circuit for the SF signals.

Figure 1B:
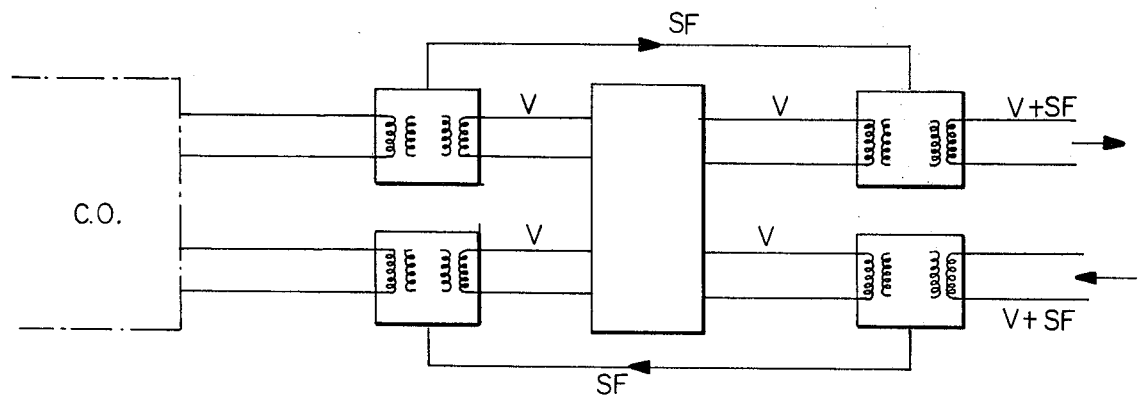

In another prior art embodiment shown in FIG. 1B, a bypass arrangement is used, this being necessary in those cases where the distances or arrangements of interfacing switching equipment is not operated by the same company. While this is a usable system in most cases, the number of transformers and other components required, and the amount of space needed, renders this approach expensive and cumbersome. In addition, there are some forms of modulated signals which cannot be handled by this approach. Thus, while dial signals at 10 Hz, are effectively bypassed, ring signals at 20 Hz are not.

In accordance with the invention, an apparatus as shown in FIG. 2 solves this problem in an expeditious and economical fashion. As shown therein, in somewhat simplified schematic form, the line side conductors indicated generally at 15 are connected to a coupling transformer 16 of conventional type and conductors, indicated as a single conductor 17, carry the signals to a 6db attenuating pad including a series resistor 18 and a shunt resistor 19, the junction between these resistors being connected to the input of an amplifier 20. The output of amplifier 20 is connected to a coupling transformer 21, the secondary side of which constitutes the drop side of the equipment. This is the basic receive line side of the apparatus.

In similar fashion, the drop side of the transmit line includes conductors 22 which are connected to a coupling transformer 23, the output of which is connected to an amplifier 24. The output of amplifier 24 is connected to a switch 25 which, effectively, is capable of separating the transmit line into electrically isolated drop and line sides. The line side of the transmit line includes a series resistor 26, an amplifier 27 and an output coupling transformer 28 which is connected to the conductors carrying the signals to a transmission medium.

As previously indicated, the present invention will be described in the context of use with an echo suppressor unit which is conventional in nature and which forms no part of the present invention, per se. Thus, the echo suppressor logic is illustrated in FIG. 2 as a block 30 and is shown interconnected with a disabler unit 31. Disabler unit 31 is also conventional equipment and is provided to cause the system to operate in a special mode when data is being transmitted over the lines, the data having special characteristics which need not be considered herein. It will be recognized that other components shown in FIG. 2 cooperate with logic 30 and constitute part of the entire echo suppressor which can operate in the usual fashion when the printed circuit board carrying the circuits of the present invention are removed. This includes switches 25 and 33, resistors 18 and 19, to be described, as well as the coupling transformers and amplifiers.

Echo suppressor 30 provides one output on a conductor 32 which is connected to operate a switch 33. Switch 33, as is the case with other switches shown and described herein, would normally constitute a semiconductor switching device such as a field effect transistor or the like. However, for simplicity, such switches are shown as simple single-pole, single-throw switches to be operated by their associated signals. Thus, an output signal on conductor 32 can be regarded as actuating switch 33 to its closed position. Switch 33 is connected in series circuit relationship with and between resistor 19 and the input of a tuned filter 34, the other terminal of which is connected to a point of reference potential indicated as −V. The other output of echo suppressor 30 is provided on conductor 35 and is connected to operate switch 25.

Between amplifier 20 and coupling transformer 21 in the receive line, a conductor 36 connects the signals on the receive line to the input of a filter 37 which has two outputs, one output being a voice signal output connected to one input of echo suppressor 30 on a conductor 38. Both outputs of filter 37 are connected to detector circuit 39, the output of which is connected to a timer circuit 40 which, after a predetermined delay, connects the signal to a driver circuit 41. The output of driver circuit 41 constitutes a monitor output signal, the function of which will be described hereinafter.

On the transmit side, a conductor 43 couples the output of amplifier 24 to the input of a filter 44 which has two outputs, one output 44a having a voice signal thereon and being connected to the other input of echo suppressor 30 on conductor 45; to a switch 46 which is connected in series circuit relationship between the filter output and a junction 47 at the line side of switch 25; and also to one input of a detector circuit 48. The other output 44b of filter 44 having SF signal is connected to the other input of detector circuit 48, the output of which is connected to three timer circuits 49, 50 and 51 which are delay timer circuits. The output of timer circuit 49 provides, after a predetermined delay of, for example, 15 milliseconds, a signal on conductor 53 to actuate a switch 54. The output of timer 50 provides, after a predetermined delay (e.g., 225 ms.), an output to actuate switch 46 and an output to operate switch 25 through a diode network. The output of timer 51 provides, also after a predetermined delay (e.g., 225 ms.), an output signal to a driver circuit 55 which also provides a monitor output on terminal 56.

An oscillator 60, which is a continuously running oscillator providing a signal at the SF signal frequency which is normally 2,600 Hz, is connected to switch 54 and, when that switch is closed, provides an SF signal on a conductor 61 which is connected to the line side of the transmit line at the junction between resistor 26 and the input to amplifier 27.

Figure 3:
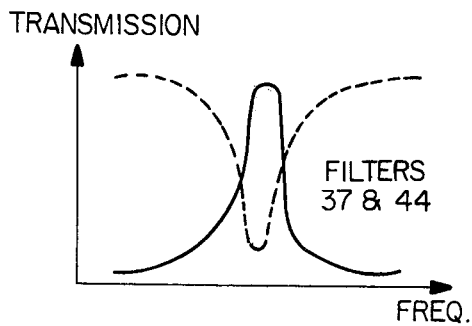
FIGS. 3 and 4 are impedance and/or transmission diagrams graphically illustrating characteristics of filters in the apparatus of FIG. 2.

Filters 37 and 44 can be viewed as having somewhat similar characteristics in that, when each of these filters is supplied with an input signal constituting a mixture of the voice and SF signals, one output has only the voice signal and the other output has only the SF signal. In either case, if the input signal lacks either the voice component or the SF component, the output related to that component is negligible. Thus, in the case of filter 37, an output having the voice signal is provided on conductor 38 to one input of the echo suppressor and, with the other output having the SF signal, is provided to detector 39. Similarly, with filter 44, one output 44a having the voice signal is provided on conductor 45 to the other echo suppressor input, to one input of detector 48 and also to one side of switch 46, while an output carrying the SF signal is provided to detector 48. This is illustrated in the graphical representation of FIG. 3 as being two relatively inverted band pass filters, one of which presents a high attenuation to voice and a low attenuation to SF and the other providing the inverse relationship. Filters of this type are, of course, well known in the filter field.

Figure 4:
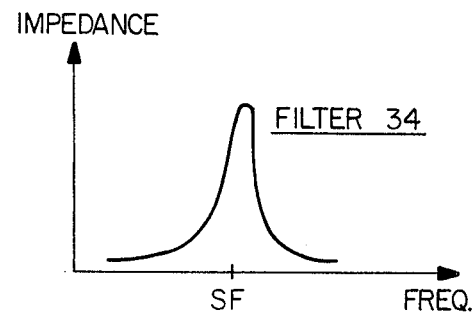

Filter 34 can be viewed as a simple band pass filter and is selected to present a high impedance at the SF frequency and a low impedance to voice, as illustrated in FIG. 4.

With this discussion of filter characteristics, the operation of the apparatus of FIG. 2 can be described. Assume, first, that a voice signal level appears on the transmit line which is sufficiently high, relative to a scaled signal level which appears on the receive line. The scale factor can be any factor but as an example 23 db can be used. With this relationship, a higher voice signal is present on conductor 43 than is present at conductor 36. Thus, the output on conductor 45 is greater than the output on conductor 38 and the echo suppressor provides an output on conductor 32 to activate switch 33. Thus, the circuit is completed through resistor 19, switch 33 and filter 34, which filter presents a high impedance to receive SF, if present, but a low impedance to other voice frequencies, thereby attenuating any received voice signal such as echo which might exist on the receive line by 6 db. However, the received SF signal is not attenuated and continues through amplifier 20 and coupling transformer 21. At the same time, if there is voice but no SF on the drop side of the transmit line, switch 25 is closed (rendered conductive) by the absence of an "open" signal from the echo suppressor comparator logic.

When there are transmit SF signals and no voice present on conductor 43, they are connected through filter 44 to detector 48 which provides an output signal to timer circuits 49, 50 and 51 which, after their delay intervals, provide output signals from timer 50 to switch 46 to open it; from timer 49 to switch 54 to close it; and from timer 51 to the driver circuit 55 and output terminal 56. When the output of detector 48 indicates the presence of an SF signal, the output at terminal 56 is in an OFF state, providing an indication that the circuit is idle. If SF is transmitted, no voice is transmitted. The purpose of filter 44 and detector 48 is to recognize the presence of SF only on lead 43. If there is a mixture of voice and SF, it is always recognized as voice only. So long as there is SF and no voice on conductor 43, timer 49 closes switch 54 to connect the output of SF oscillator 60 to the transmit line on conductor 61 to the input of amplifier 27 as a regenerated SF signal. Thus, if the SF signal is present on the drop side of the transmit line, it is regenerated and is therefore present on the line side of the transmit line.

Consider now the condition in which the voice signal on the receive line is greater than that on the transmit line. Under these conditions, the voice signals on conductors 38 and 45 to the echo suppressor cause the suppressor to provide no output signal on conductor 32, thereby leaving switch 33 in its open or nonconductive state. A signal on conductor 35 opens switch 25 and switch 46 through a diodes circuit. Thus, the breaker transmit signal is suppressed and does not appear on the line side. Also, filter 34 is inactive and the received voice signals continue through amplifier 20 and coupling transformer 21 to the drop side of the receive line.

When an SF signal and no voice level is present on the transmit line, but a strong voice signal exists on the receive line, the SF signal again actuates detector 48 and timer 49 to connect oscillator 60 through switch 54 to the line side of the transmit line at the input to amplifier 27 as previously described. For the sake of completeness, more detailed schematic diagrams of portions of the circuit of FIG. 2 are shown in FIGS. 5, 6 and 7.

However, since these circuits are individually rather conventional, they will not be described in great detail beyond the following general remarks.

FIG. 5 shows the circuit including pad resistors 18 and 19, which are of equal value for 6 db attenuation. Switch 33 is a field effect transistor operated by a signal on conductor 32, and filter 34 is a parallel resonant LC circuit sharply tuned to the frequency of the SF signal to present a high impedance at that frequency.

In FIG. 6, split filter 37 is recognizable as a combined series-parallel LC filter, the parallel portion thereof presenting a low impedance to voice which therefore appears on conductor 38 as an input to the echo suppressor and is provided to one channel 65 of detector 39. The SF signal from the series LC portion of the filter is provided to a second channel 66 of detector 39. The detected outputs of the two channels are compared in a differential amplifier 67 and, when the SF signal level is recognized as being present, an output is provided to timer circuit 40. After the delay determined by the time constant of that circuit, driver circuit 41 provides an output at terminal 42. This constitutes a monitor signal indicating an idle condition.

FIG. 7 shows filter circuit 44 which also constitutes a hybrid series-parallel filter providing separate voice and SF outputs to detector 48 which is generally similar in circuit configuration to detectors 65 and 66. Oscillator 60 is a conventional Wien bridge oscillator and can include temperature compensation for stability of frequency and amplitude.

While one advantageous embodiment has been chosen to illustrate the invention, it will be understood by those skilled in the art that various changes and modifications can be made therein without departing from the scope of the invention as defined in the appended claims.

What is claimed is:

1. In an interface unit for interconnecting voice signals and preselected single frequency control signals between a drop side terminal and a four wire transmission system having receive and transmit line pairs, the unit being of the type having echo suppressor means for comparing scaled voice signal levels on the receive and transmit lines and for reducing the signal level on the one of those lines having the smaller voice signal level, and means for coupling voice signals from the transmit and receive lines to the echo suppressor means for comparison, an improved apparatus for assuring continued transmission of the single frequency control signals comprising passive circuit means connected to the receive line pair for preventing reduction of the control signal level when said echo suppressor means reduces the voice signal level on said receive line;

circuit means for separating the transmit line into electrically isolated "drop" and "line" sides;

means coupled to said drop and line sides of said transmit line for coupling an internally generated control signal to said line side of said transmit line whenever a control signal is present on said drop side of said transmit line; and means responsive to said echo suppressor means for actuating said means for separating to couple a voice signal from said drop side to said line side of said transmit line whenever the scaled voice signal level on said receive line is lower than the scaled voice signal level on said transmit line.

2. An apparatus according to claim 1 which further comprises
   means connected to said receive line for generating a monitor output signal when no control signal is present on said receive line.

3. An apparatus according to claim 1 wherein said passive circuit means includes
   an impedance connected to said receive line;
   a passive filter connected between said impedance and a point of reference potential,
      said filter being turned to present a high impedance to the frequency of said control signal and a low impedance to other frequencies in the voice signal spectrum; and
   switch means responsive to an output of said echo suppressor means for completing the circuit to said filter when the voice signal level is greater on said transmit line than on said receive line.

4. An apparatus according to claim 3 wherein said means coupled to said transmit line includes
   an oscillator for substantially continuously generating a signal at the control signal frequency;
   filter circuit means connected to the drop side of said transmit line for producing an output signal when control signal is present on said drop side;
   switch circuit means responsive to an output signal from said filter circuit means for selectively connecting the output of said oscillator to said line side of said transmit line.

5. An apparatus according to claim 4 wherein said switch circuit means includes.

timer circuit means for delaying the connection of said oscillator to said line for a predetermined interval.

6. An apparatus according to claim 4 wherein said filter circuit means connected to said drop side of said transmit line further includes means for producing a voice output signal when a voice signal is present on said drop side
   and said means responsive to said echo suppressor includes switch means for connecting said voice output signal to the line side of said transmit line.

7. An apparatus according to claim 1 and further comprising
   filter circuit means connected to said receive line for producing a distinctive output signal when a control signal is present on said receive line; and
   detector circuit means connected to said filter circuit means for providing an output indicative of an "idle" condition when said distinctive output signal is present.

8. An apparatus according to claim 1 wherein said means coupled to said drop and line sides of said transmit line includes
   filter circuit means connected to said drop side of said transmit line for producing a distinctive output when a control signal is present on said drop side; and
   detector circuit means connected to said filter circuit means for providing an output indicative of an "idle" condition when said distinctive output signal is present.

* * * * *